US009162260B2

United States Patent
Dumontier et al.

(10) Patent No.: US 9,162,260 B2
(45) Date of Patent: Oct. 20, 2015

(54) CLEANING MECHANISM FOR A COMPUTER USING COOLING FAN AIRFLOW OUTPUT

(71) Applicant: International Business Machines Corporation, Armonk, NY (US)

(72) Inventors: Colin G. Dumontier, Montpellier (FR); Gerald Laumay, Castelnau le lez (FR); Christine O'Sullivan, Montpellier (FR); Pascal Vezolle, Villeneuve les Maguelone (FR)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 14/159,494

(22) Filed: Jan. 21, 2014

(65) Prior Publication Data

US 2014/0251389 A1 Sep. 11, 2014

(51) Int. Cl.
*G06F 1/20* (2006.01)
*B08B 5/02* (2006.01)

(52) U.S. Cl.
CPC ..... *B08B 5/02* (2013.01); *G06F 1/20* (2013.01)

(58) Field of Classification Search
CPC .................................. G06F 1/20; G06F 1/203
See application file for complete search history.

(56) References Cited

U.S. PATENT DOCUMENTS

| | | | |
|---|---|---|---|
| 6,592,448 B1* | 7/2003 | Williams | 454/184 |
| 6,766,560 B2* | 7/2004 | Murphy | 15/414 |
| 7,113,402 B2 | 9/2006 | Rutledge et al. | |
| 8,203,840 B2 | 6/2012 | Lin et al. | |
| 2008/0120802 A1* | 5/2008 | Harvey | 15/405 |
| 2009/0016019 A1 | 1/2009 | Bandholz et al. | |
| 2011/0256019 A1 | 10/2011 | Gruen et al. | |
| 2012/0118327 A1 | 5/2012 | Mazmanyan | |

FOREIGN PATENT DOCUMENTS

DE 102008046229 A1 * 3/2010 ............... B08B 1/00

OTHER PUBLICATIONS

Chandler, David L., "Through a glass, clearly", MIT news, pp. 1-4, <http://web.mit.edu/newsoffice/2012/glare-dust-and-fog-free-glass-0426.html>.

(Continued)

*Primary Examiner* — Robert J Hoffberg
(74) *Attorney, Agent, or Firm* — Ian A. McKee; Jason H. Sosa (57) ABSTRACT

A cleaning mechanism includes: an airflow control chamber for receiving exhaust air from a cooling fan; a cleaning outlet for outputting the exhaust air to be used for cleaning; a flexible pipe having one end in communication with the cleaning outlet and one free end directable by a user for cleaning; and an activation component for activating a cleaning operation in which the exhaust air is directed through the flexible pipe. The activation component may include a switching mechanism for switching the direction of airflow in the airflow control chamber between the cleaning outlet and an exit out of the computer. The cleaning mechanism may include an airflow accelerator for increasing the airflow to the cleaning outlet.

5 Claims, 7 Drawing Sheets

(56) References Cited

OTHER PUBLICATIONS

IBM, "Redirected CPU fan Airflow Cleans Dusty Laptop Screen when the Lid is Closed", An IP.com Prior Art Database Technical Disclosure, Jul. 23, 2008, IPCOM000172983D <http://ip.com/IPCOM/000172983>.

Undisclosed Authors, "Method for a self-cleaning PC", An IP.com Prior Art Database Technical Disclosure, Nov. 20, 2002, IPCOM000010327D <http://ip.com/IPCOM/000010327>.

* cited by examiner

FIG. 5

# CLEANING MECHANISM FOR A COMPUTER USING COOLING FAN AIRFLOW OUTPUT

RELATED APPLICATIONS

This application claims the benefit of priority to United Kingdom Patent Application Serial No. GB 1304008.4, filed on Mar. 6, 2013, the contents of which are hereby incorporated by reference.

FIELD OF INVENTION

This invention relates to the field of cleaning mechanisms for computers. In particular, the invention relates to a cleaning mechanism for a computer using cooling fan airflow output.

BACKGROUND OF INVENTION

Dust is an on-going problem for computer users as it gathers on both screens and keyboards.

Dust may be attracted to a computer screen due to static. A computer screen is a sensitive surface which should not be cleaned or wiped with normal cleaning products.

Dust and other small particles may lodge between the keys of a keyboard and may be difficult to remove. Keyboard cleaning often requires turning the keyboard upside-down and shaking which is a hazardous way to clean sensitive and expensive equipment.

Aerosol sprays of compressed air are available which may be used as a safe cleaning method by blowing the dust from the screen and from the keyboard. However, such products are not always to hand and a busy computer user may often resort to other, less favourable methods to clean the screen and keyboard.

Therefore, there is a need in the art to address the aforementioned problems.

BRIEF SUMMARY OF THE INVENTION

A cleaning mechanism for a computer having a cooling fan and an associated method are provided. The cleaning mechanism includes: an airflow control chamber for receiving exhaust air from a cooling fan; a cleaning outlet for outputting the exhaust air to be used for cleaning; a flexible pipe having one end in communication with the cleaning outlet and one free end directable by a user for cleaning; and an activation component for activating a cleaning operation in which the exhaust air is directed through the flexible pipe. The activation component may include a switching mechanism for switching the direction of airflow in the airflow control chamber between the cleaning outlet and an exit out of the computer. The cleaning mechanism may include an airflow accelerator for increasing the airflow to the cleaning outlet.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for using output airflow of a cooling fan of a computer for cleaning the computer. The exhaust airflow during use of the computer is redirected to a cleaning air outlet, either permanently or when selected by a user.

An integrated mechanism is provided taking advantage of existing cooling fan airflow and power supply. The mechanism provides the capability to redirect and accelerate the output airflow from a cooling fan towards a cleaning air outlet.

In one embodiment, the cleaning air outlet is in the form of an integrated, mobile and flexible pipe. The user may manually extract one end of the pipe from a location in or on the computer and the airflow may be directed through this pipe and used to clean one or both the screen and the keyboard.

In another embodiment, the cleaning air outlet may have a permanent airflow towards the screen to prevent dust accumulation.

According to a first aspect of the present invention there is provided a cleaning mechanism for a computer having a cooling fan, the cleaning mechanism comprising: an airflow control chamber for receiving exhaust air from a cooling fan; a cleaning outlet for outputting the exhaust air to be used for cleaning; a flexible pipe having one end in communication with the cleaning outlet and one free end directable by a user for cleaning; and an activation component for activating a cleaning operation in which the exhaust air is directed through the flexible pipe.

In one embodiment, the activation component may include a switching mechanism for switching the direction of airflow in the airflow control chamber between the cleaning outlet and an exit out of the computer.

The cleaning mechanism may include an airflow accelerator for increasing the airflow to the cleaning outlet. The cleaning mechanism may include two channels in the airflow control chamber, a first channel for the exhaust air to the airflow accelerator, and a second channel from an inlet in communication with the outside of the computer to the airflow accelerator.

In another embodiment, the activation component may activate the airflow accelerator thereby directing airflow to the cleaning outlet.

The cleaning outlet may include a connection to an airflow director for directing and diffusing the exhaust air to a screen of the computer permanently when the computer is in use. The airflow director may be a chamber with an inlet from the cleaning outlet and multiple holes adjacent a computer screen through which air is emitted.

The activation component may divert the air from the airflow director to the flexible pipe for dedicated manual cleaning.

The cleaning mechanism may include a housing in the computer for the flexible pipe when not in use.

The switching mechanism for switching the direction of airflow in the airflow control chamber between the cleaning outlet and an exit out of the computer may be in the form of a shutter positioned across the chamber.

The activation component may reduce or stop one or more components being cooled by the cooling fan to increase power to the cooling fan and increase the airflow of the exhaust air.

According to a second aspect of the present invention there is provided a method of cleaning or a computer having a cooling fan, the method comprising: activating a cleaning operation; directing exhaust air from the cooling fan through the flexible pipe, wherein the flexible pipe having one end in communication with a cleaning outlet and one free end directable by a user for cleaning.

In one embodiment, activating a cleaning operation includes switching the direction of airflow in the airflow control chamber between a cleaning outlet and an exit out of the computer.

The method may additionally include accelerating the exhaust airflow for increasing the airflow to the cleaning outlet.

The method may further include permanently directing exhaust air from the cooling fan to an airflow director to diffuse the air across a screen of the computer when in use.

In another embodiment, activating the cleaning operation may divert the air from the airflow director to the flexible pipe.

Switching the direction of airflow in the airflow control chamber between the cleaning outlet and an exit out of the computer may be carried out by moving a shutter positioned across the chamber.

According to a third aspect of the present invention there is provided a method substantially as described with reference to the figures.

According to a fourth aspect of the present invention there is provided a system substantially as described with reference to the figures.

The described aspects of the invention provide the advantage of providing a safe and effective method of cleaning a computer without any external equipment by using the existing exhaust of a computer's cooling fan.

Figure 1A:
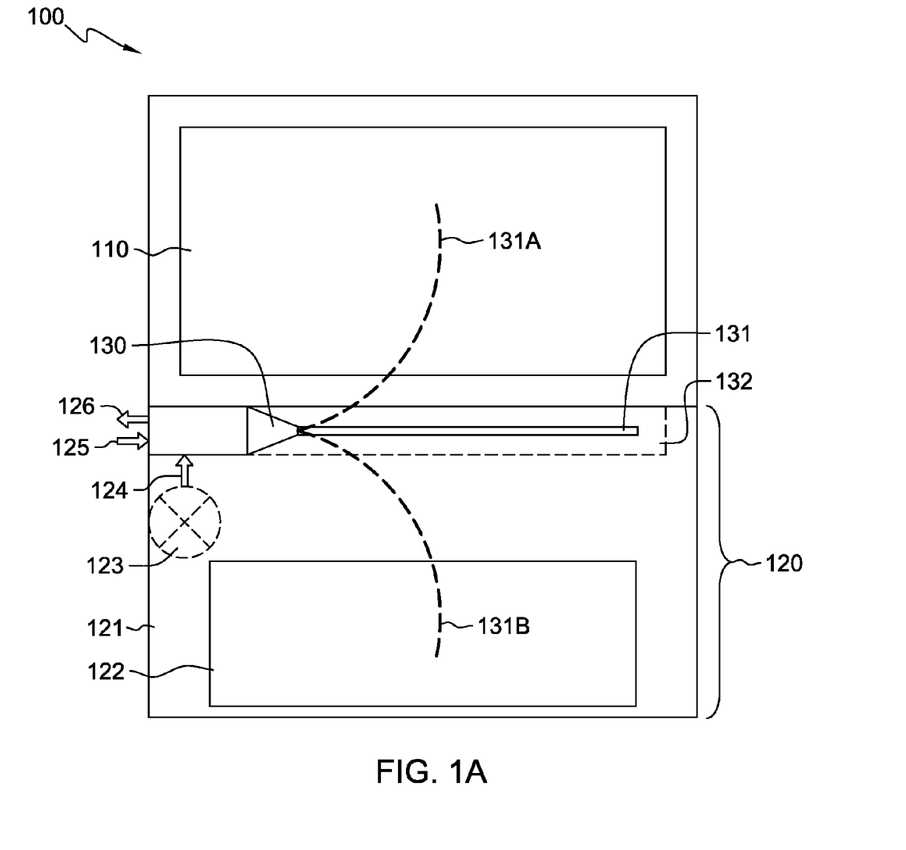
FIGS. 1A and 1B are schematic diagrams of two embodiments of a computer having a cleaning mechanism in accordance with the present invention.
Figure 1B:
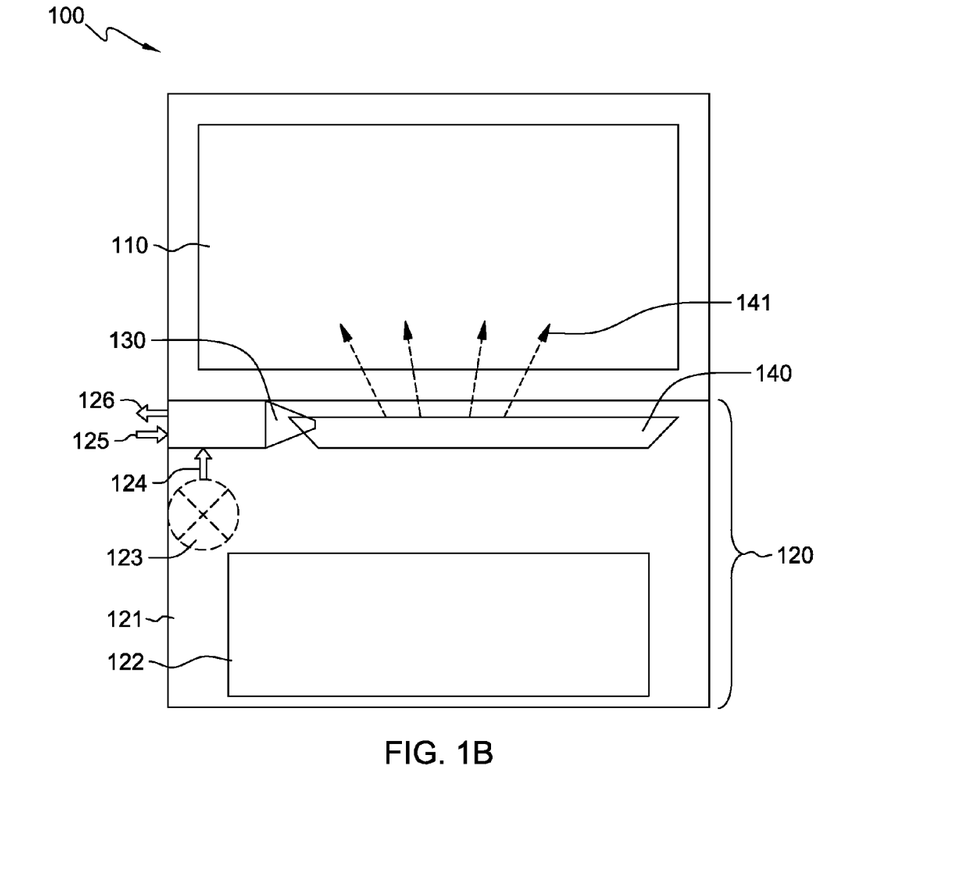

Referring to FIGS. 1A and 1B, a diagram shows a computer in the form of a laptop computer 100 having a screen 110 attached to the body 120 of the computer. The body 120 of the computer has a casing 121 and includes a keyboard 122. The body 120 of the computer has at least one internal cooling fan 123 (shown in dashed lines) inside the casing 121 of the computer.

FIGS. 1A and 1B show the computer in the form of a laptop computer. However, the computer may take other forms, such as a desktop computer with separate screen and keyboard, or a laptop computer with removable screen.

The cooling fan 123 may cool one or more of various components of the computer including the processor, graphics card, RAM and other components that produce heat during operation. The cooling fan 123 operates by moving heated air away from the components and drawing cooler air over them. The cooling fan 123 may be provided in combination with a heat sink to increase the surface area of the heated surface in contact with the air.

The form of the cooling fan 123 is not relevant to the described invention as long as there is an output 124 of exhaust air from the cooling fan 123. The cooling fan 123 may have an exhaust exit 125 in the casing 121 and may have a separate or combined intake opening 126 for air in the casing 121.

In the described system, a cleaning air outlet 130 is provided from the cooling fan 123 through which some or all of the exhaust air from the cooling fan 123 may be directed. The cleaning air outlet 130 may be provided instead of or as well as a conventional exhaust air outlet 125 which goes out of the casing 121 providing an outlet for the exhaust air from the cooling fan 123.

In one embodiment shown in FIG. 1A, the cleaning air outlet 130 may have a flexible pipe 131 though which some or all of the output air may pass. The pipe may be located in the upper part of the laptop within a chamber closed by a shutter 132. The airflow pipe 131 may be extracted by a user and pointed at areas which require cleaning as shown from the dashed lines (131A, 131B). A flexible pipe 131 allows higher airflow to focus on specific points, and so a much better dust removal efficiency.

In another embodiment shown in FIG. 1B, the cleaning air outlet 130 may also or alternatively have an air director 140 for directing the output air 141 towards the screen 110 of the computer in order to prevent dust from staying on the screen.

Figure 2A:
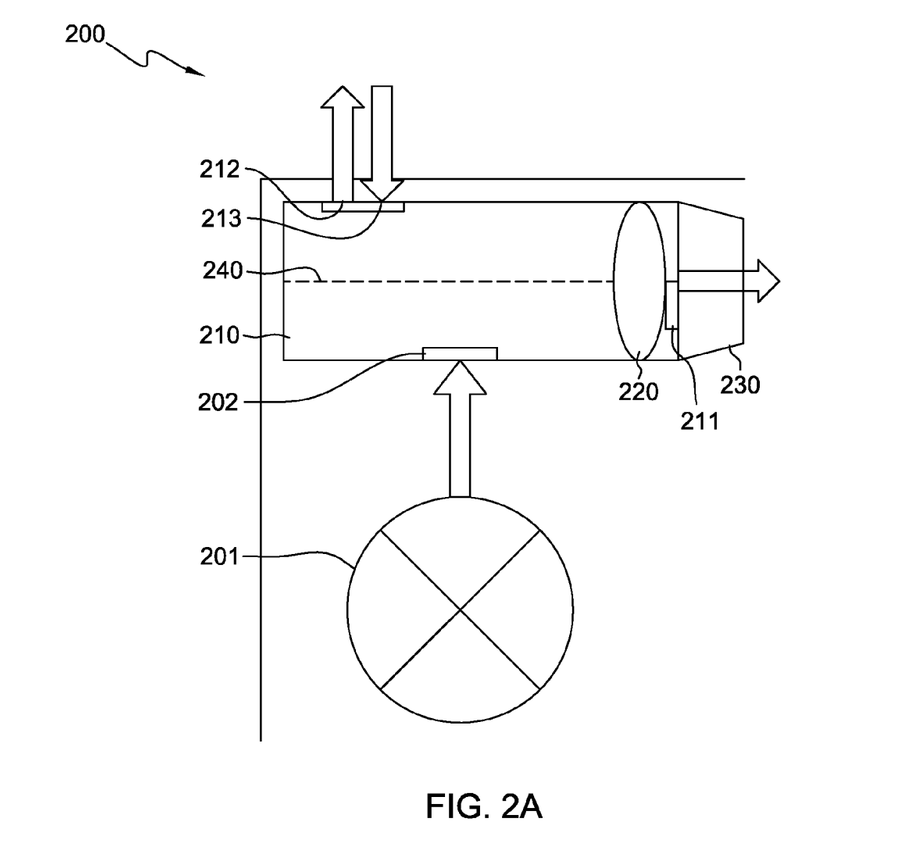
FIGS. 2A and 2B are schematic diagrams of two embodiments of a cleaning mechanism in accordance with the present invention.

Referring to FIG. 2A, a schematic diagram of inside a casing of a computer shows a first embodiment of the described cleaning mechanism 200.

A cooling fan 201 is provided with an exhaust air outlet 202 which directs the exhaust air from the cooling fan 201 to an airflow control chamber 210. The airflow control chamber 210 directs and, optionally, accelerates the exhaust air to a cleaning air outlet 230. An exit 211 is provided from the airflow control chamber 210 to the cleaning air outlet 230.

The airflow control chamber 210 may include an airflow accelerator 220 which may be in the form of an additional fan or other airflow acceleration mechanism. The accelerator 220 may be positioned adjacent the exit 211 from the airflow control chamber 210 to the cleaning air outlet 230 so that the exhaust air may be accelerated into the cleaning air outlet 230.

The airflow control chamber 210 may include an air exit 212 for expelling air to outside the casing of the computer. If the cleaning air outlet 230 is not in use, the air exit 212 becomes the standard air exit for the exhaust air from the cooling fan 201.

The airflow control chamber 210 may include an air inlet 213 for sucking air into the airflow control chamber 210 from outside the casing of the computer. If the accelerator 220 is used, this air inlet 213 may be required to provide extra air to the cleaning air outlet 230.

The air exit 212 and air inlet 213 may be combined as a single opening to the outside of the casing of the computer and during the cleaning phase, the combined opening may be used as an inlet to increase airflow.

The airflow control chamber 210 may have a chamber switching mechanism 240 enabling the isolation of the exit 211 to the cleaning air outlet 230 from the standard air exit 212. The chamber switching mechanism 240 may be achieved by the user by simple manual shutters which ensure the airflow is directed towards either the cleaning air outlet 230 or the standard air exit 212.

When the chamber switching mechanism 240 is closed, the exit 211 to the cleaning air outlet 230 may receive the exhaust air from the exhaust air outlet 202 as well as the outside air from the air inlet 213.

When the chamber switching mechanism 240 is open, the exit 211 to the cleaning air outlet 230 will not receive the exhaust air from the exhaust air outlet 202 and the exhaust air will be expelled through the standard air exit 212.

The switching mechanism 240 may be a rotating shutter located on the top of bottom of the chamber when open. It may be coupled with an opening/closing shutter (or the same shutter may be used for simplification) for the exit 211. Closing the switching mechanism 240 may automatically open the shutter of exit 211. A mechanical or software process may guarantee this to prevent any damages.

The switching mechanism 240 may take many different forms and layouts and the example shown in FIG. 2A is one suggested arrangement.

The speed of the cooling fan may be increased to provide enough pressure for the cleaning process. As another option, particularly if a laptop computer is not connected to a power supply, the other components which are cooled by the fan (processor, memory, disk, etc.) may be slowed down or shut down during cleaning. An extra fan or other form of airflow accelerator may also be turned on to accelerate the airflow.

Figure 2B:
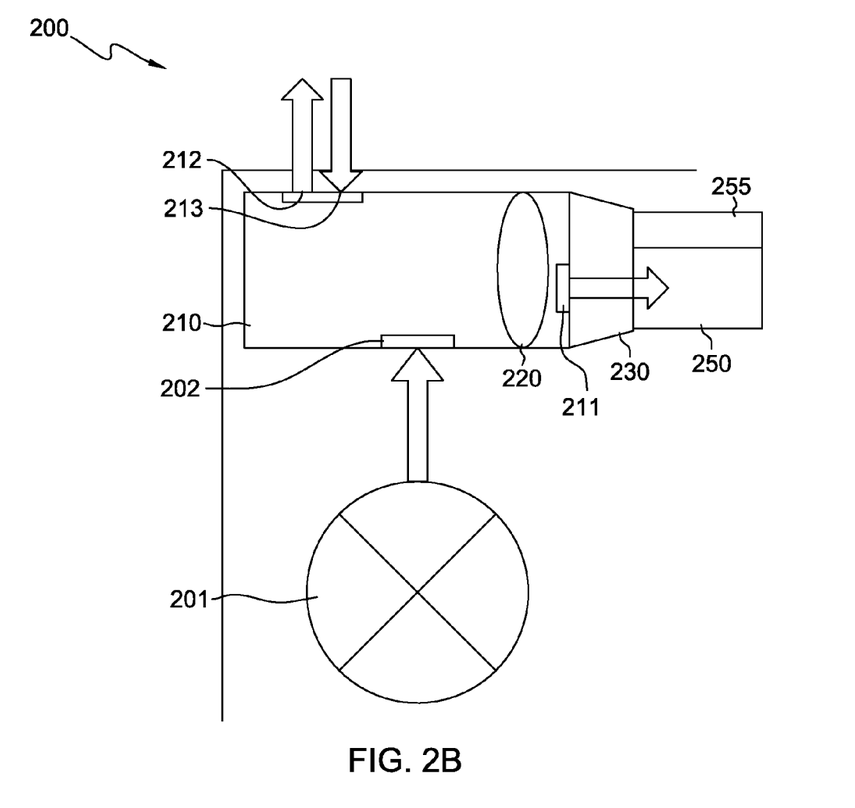

Referring to FIG. 2B, a schematic diagram of inside a casing of a computer shows a second embodiment of the described cleaning mechanism 200.

In this embodiment, the cleaning air outlet 230 is permanently in use. The cleaning air outlet 230 includes an air director 250 for diffusing the exhaust air from the cooling fan towards the screen of the computer.

No chamber switching mechanism 240 may be needed in this embodiment as the exhaust air is permanently exiting through the cleaning air outlet 230.

When additional manual cleaning using the flexible pipe 255 is required, the manual cleaning may be selected by activating the accelerator 220 to provide additional air flow.

Potential air flow perturbations from an outside air inlet 213 may be generated, so in the permanent mode, the optional airflow from air inlet 213 may be isolated for instance having two independent entrances for the accelerator 220 with an option to close air inlet 213. A permanent arrangement of two independent channels for the accelerator 220 and exit 211 may be provided.

In one option, a switch between the air director 250 and the pipe 255 may be provided to direct air to the flexible pipe 255 when required.

In an alternative option (not shown in the Figures), the exhaust air may permanently flow through the flexible pipe to the airflow director which then diffuses the air to the screen. When the additional cleaning is required, one end of the flexible pipe may be removed from a connection to the airflow director and used to clean the screen or keyboard using a more forceful stream of air.

Figure 3:
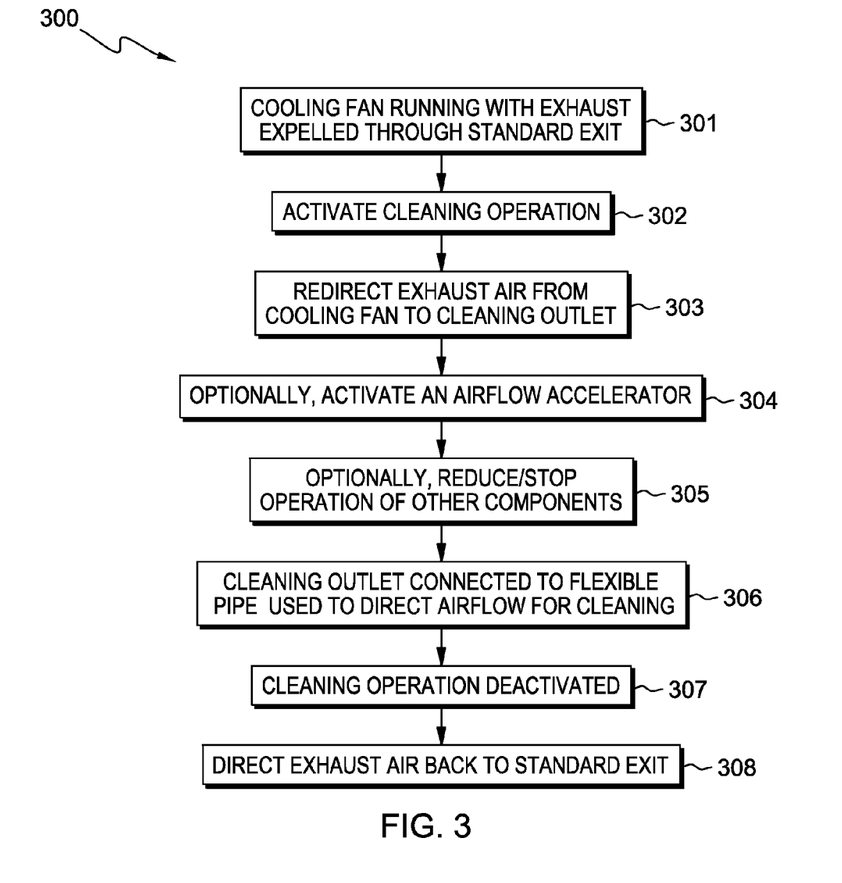
FIG. 3 is a flow diagram of a first embodiment of a method in accordance with the present invention.

Referring to FIG. 3, a flow diagram 300 shows a first embodiment of the described method.

A computer, in normal use, may have a cooling fan running 301 to cool one or more internal components of the computer. The cooling fan generates exhaust air which may be expelled via a standard exit in the computer casing.

In the described method, a cleaning operation may be activated 302 by a user and the exhaust airflow from the cooling fan may be redirected 303 to a cleaning outlet. In this embodiment, the redirection may be carried out by a switching mechanism in an airflow control chamber which directs the exhaust airflow to the cleaning outlet and not to the standard exit in the computer casing.

Optionally, an airflow accelerator may be run 304 to increase the airflow to the cleaning outlet. Additional air may be sucked in from outside the casing, if required for the increased airflow.

Also optionally, the operation of components being cooled may be reduced/stopped 305 in order to provide additional power to the cooling fan to increase the airflow.

The cleaning outlet may be connected to a flexible pipe which may be used 306 by one end being removed from a housing in the computer casing and manually directed to areas of the computer that need cleaning.

When the cleaning has finished, the cleaning operation may be de-activated 307 and the airflow directed 308 back to the standard exit in the casing. The redirection may be by the reverting the switching mechanism in the airflow control chamber to direct the exhaust airflow to the standard exit in the computer casing and not to the cleaning outlet.

Figure 4:
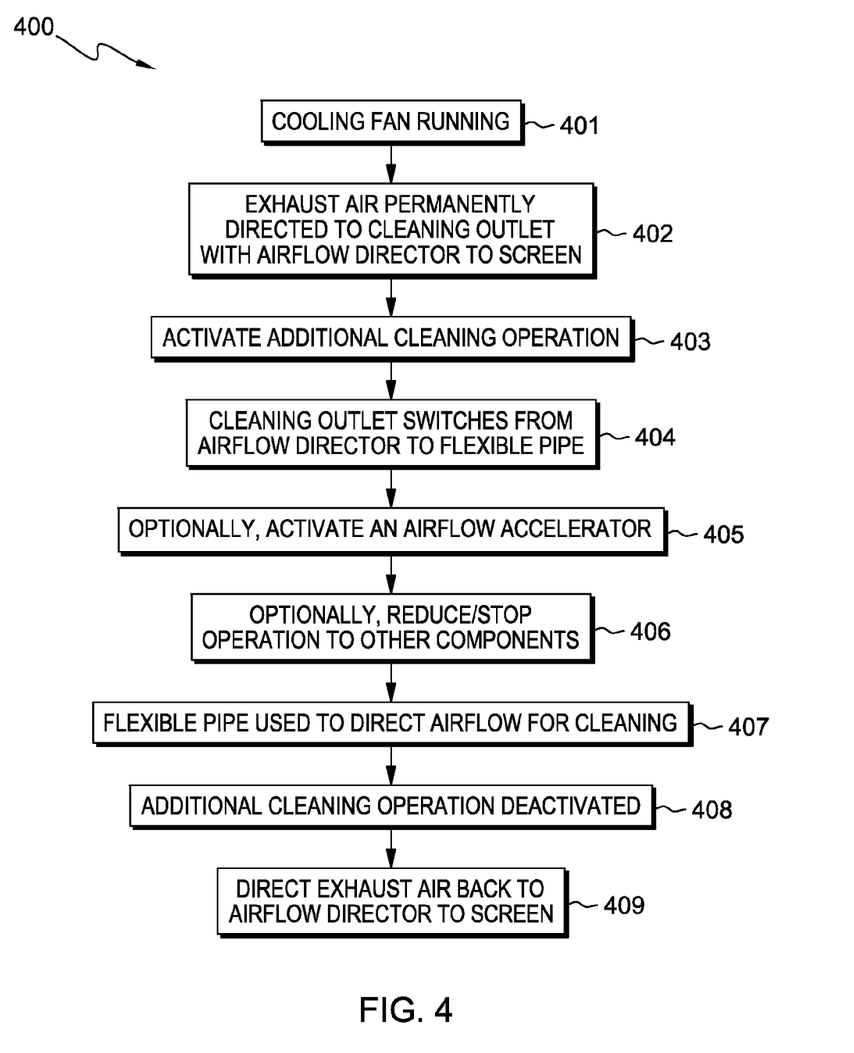
FIG. 4 is a flow diagram of a second embodiment of a method in accordance with the present invention.

Referring to FIG. 4, a flow diagram 400 shows a second embodiment of the described method.

A computer, in normal use, may have a cooling fan running 401 to cool one or more internal components of the computer. The cooling fan generates exhaust air which, this embodiment is permanently directed 402 to a cleaning outlet which has an airflow director for diffusing the airflow across the screen of the computer.

An additional cleaning operation may be activated 403 by a user and the exhaust airflow from the cooling fan to the cleaning outlet may be switched 404 to a flexible pipe instead of the airflow director.

Optionally, an airflow accelerator may be run 405 to increase the airflow to the cleaning outlet and hence to the flexible pipe. Alternatively, the narrow diameter of the pipe may be sufficient to increase the airflow to be used for precise cleaning. Additional air may be sucked in from outside the casing by the accelerator, if required for the increased airflow.

Also optionally, the operation of components being cooled may be reduced/stopped 406 in order to provide additional power to the cooling fan to increase the airflow.

The flexible pipe may be used 407 by one end being removed from a housing in the computer casing and manually directed to areas of the computer that need cleaning.

When the manual cleaning has finished, the additional cleaning operation may be de-activated 408 and the cleaning outlet switched back 409 back to the airflow director to diffuse the air to the screen again.

Various clean algorithms may be used to control the cleaning operation and the amount of power required by the cooling fan and the operation of an additional accelerator. Such algorithms may be provided as automatic routines run by the computer at periodic intervals or when a user manually activates the flexible pipe cleaning. For example, when the flexible pipe cleaning mode is required, the cooling fan may require additional power with the other components powering down, and/or the additional accelerator may be activated. A prompt may be provided on screen to inform a use of a scheduled cleaning and powering down of other components which may be overridden if the cleaning is scheduled for an inconvenient time. However, this would result in a reminder that cleaning is required.

Figure 5:
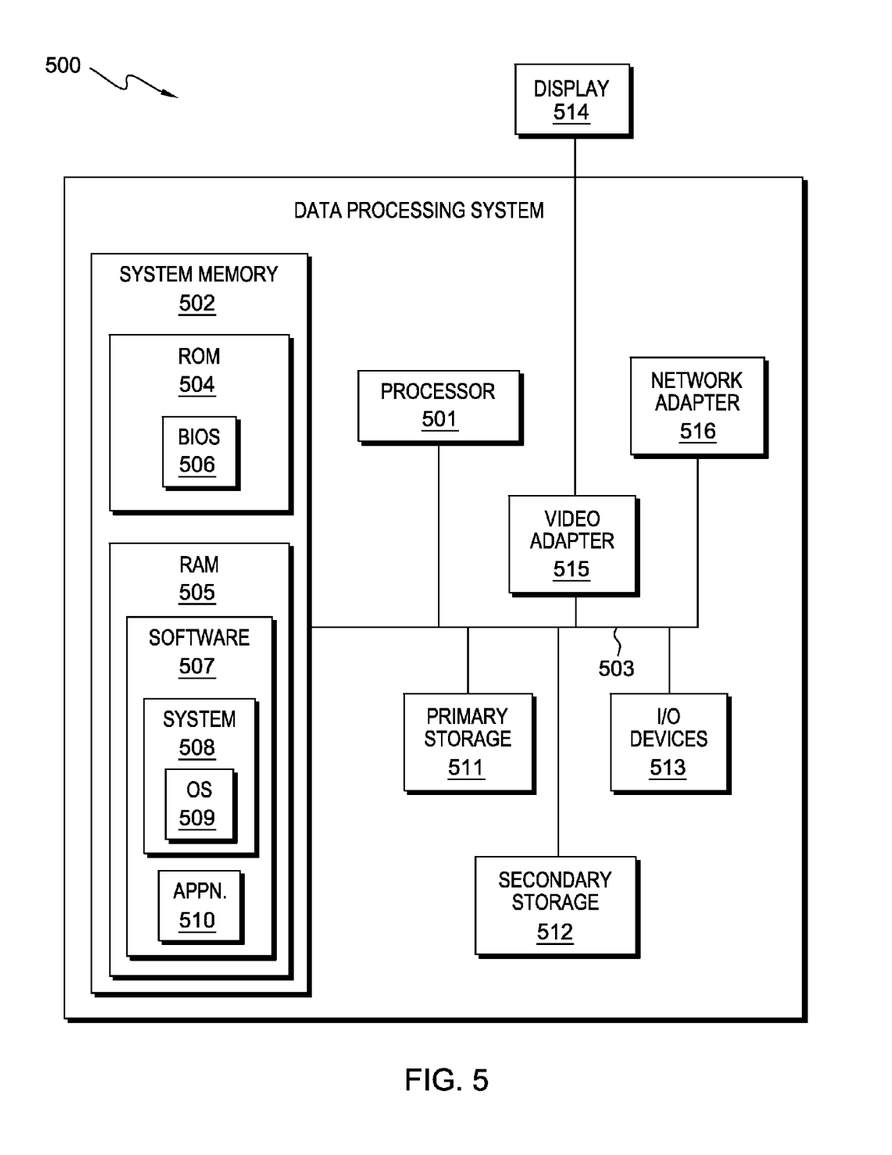
FIG. 5 is a block diagram of an embodiment of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Improvements and modifications can be made to the foregoing without departing from the scope of the present invention.

The invention claimed is:

1. A method of cleaning a computer having a cooling fan, the method comprising:
   providing a cooling fan to cool one or more components of the computer;
   exhausting exhaust airflow from the one or more components through an exit out of the computer; and
   upon activation of a cleaning operation, diverting at least a first portion of the exhaust air, generated by the cooling fan, from the exit out of the computer to a cleaning outlet directing airflow into a flexible pipe,
   wherein the flexible pipe has one end in communication with the cleaning outlet and one free end directable by a user for cleaning.

2. The method as claimed in claim 1, including:
   accelerating the exhaust airflow for increasing the exhaust airflow to the cleaning outlet.

3. The method as claimed in claim 1, wherein the exhausting the exhaust airflow from the one or more components through the exit out of the computer comprises:
   permanently directing at least a second portion of the exhaust air from the cooling fan to an airflow director to diffuse the exhaust air across a screen of the computer when in use.

4. The method as claimed in claim 3, wherein the diverting the at least the first portion of the exhaust air from the exit out of the computer to the cleaning outlet comprises diverting at least a portion of the exhaust air, other than the second portion, from the airflow director to the cleaning outlet.

5. The method as claimed in claim 1, wherein the diverting the at least the first portion of the exhaust air from the exit out of the computer to the cleaning outlet comprises moving a shutter positioned across an airflow control chamber.

\* \* \* \* \*